US009443067B1

(12) United States Patent
Enderwick et al.

(10) Patent No.: US 9,443,067 B1
(45) Date of Patent: *Sep. 13, 2016

(54) SYSTEM FOR THE DISTRIBUTION AND DEPLOYMENT OF APPLICATIONS, WITH PROVISIONS FOR SECURITY AND POLICY CONFORMANCE

(71) Applicant: Symantec Corporation, Mountain View, CA (US)

(72) Inventors: Thomas Jeffrey Enderwick, San Francisco, CA (US); Christopher Edward Perret, Carlsbad, CA (US)

(73) Assignee: Symantec Corporation, Mountain View, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/450,179

(22) Filed: Aug. 1, 2014

Related U.S. Application Data

(63) Continuation of application No. 13/226,351, filed on Sep. 6, 2011, now Pat. No. 8,832,855.

(60) Provisional application No. 61/402,934, filed on Sep. 7, 2010.

(51) Int. Cl.
*G06F 21/30* (2013.01)
*H04L 29/06* (2006.01)
*G06F 9/445* (2006.01)

(52) U.S. Cl.
CPC .............. *G06F 21/30* (2013.01); *G06F 8/60* (2013.01); *H04L 63/06* (2013.01)

(58) Field of Classification Search
CPC ......... H04L 9/00; H04L 29/06; G06F 21/10; G06F 21/105; G06F 21/12; G06F 21/121; G06F 21/125; G06F 21/14; G06F 21/16; G06F 21/54; G06F 21/30; G06F 9/445
See application file for complete search history.

(56) References Cited

U.S. PATENT DOCUMENTS

| 5,138,712 A | 8/1992 | Corbin et al. |
| 5,737,416 A | 4/1998 | Cooper et al. |
| 5,825,883 A * | 10/1998 | Archibald ............... G06F 21/10 705/30 |
| 6,005,935 A | 12/1999 | Civanlar |
| 6,035,403 A | 3/2000 | Subbiah et al. |

(Continued)

OTHER PUBLICATIONS

Grier et al., Secure web browsing with the OP web browser, 2008, IEEE.

(Continued)

*Primary Examiner* — Darren B Schwartz
(74) *Attorney, Agent, or Firm* — Holland & Hart LLP

(57) ABSTRACT

A system and method are disclosed for deploying applications to end point devices. The applications are obtained from a marketplace that checks the applications and packages them for endpoint use according to certain policies. Packaging an application includes compiling or assembling and linking the application, possibly with a framework and possibly with a binding token, which can be a device binding token and/or a user binding token. The application is loaded onto an endpoint device and if the application is bound to the device and the user is allowed to use the application, the application is enabled to be used on the endpoint device. A gateway between the endpoint device and an authentication server helps to authenticate the user. The gateway also manages data transfers between the endpoint device and a data server according to a selected protocol.

20 Claims, 17 Drawing Sheets

(56) References Cited

U.S. PATENT DOCUMENTS

| | | |
|---|---|---|
| 6,134,593 A | 10/2000 | Alexander et al. |
| 6,134,659 A | 10/2000 | Sprong et al. |
| 6,243,468 B1 | 6/2001 | Pearce et al. |
| 6,260,141 B1 | 7/2001 | Park |
| 6,460,140 B1 | 10/2002 | Schoch et al. |
| 6,615,191 B1 | 9/2003 | Seeley |
| 6,801,999 B1 | 10/2004 | Venkatesan et al. |
| 7,134,016 B1 | 11/2006 | Harris |
| 7,823,192 B1 * | 10/2010 | Fultz .................. G06F 21/33 709/225 |
| 7,949,998 B2 | 5/2011 | Bleisch et al. |
| 2001/0011254 A1 | 8/2001 | Clark |
| 2001/0039625 A1 | 11/2001 | Ananda |
| 2001/0044780 A1 * | 11/2001 | Miyazaki ............ G06F 21/10 705/53 |
| 2001/0044782 A1 | 11/2001 | Hughes et al. |
| 2001/0051928 A1 | 12/2001 | Brody |
| 2002/0073316 A1 | 6/2002 | Collins et al. |
| 2002/0087883 A1 | 7/2002 | Wohlgemuth et al. |
| 2003/0135756 A1 | 7/2003 | Verma |
| 2003/0177351 A1 | 9/2003 | Skingle |
| 2003/0191823 A1 | 10/2003 | Bansal et al. |
| 2004/0107368 A1 | 6/2004 | Colvin |
| 2004/0123122 A1 * | 6/2004 | Asai .................... G06F 21/14 713/189 |
| 2004/0148525 A1 | 7/2004 | Aida et al. |
| 2004/0167859 A1 | 8/2004 | Mirabella |
| 2004/0168061 A1 | 8/2004 | Kostal et al. |
| 2004/0199766 A1 | 10/2004 | Chew et al. |
| 2004/0202324 A1 | 10/2004 | Yamaguchi et al. |
| 2004/0267645 A1 * | 12/2004 | Pollari ................ G06F 21/10 705/34 |
| 2005/0005098 A1 | 1/2005 | Michaelis et al. |
| 2005/0021992 A1 | 1/2005 | Aida et al. |
| 2005/0049970 A1 | 3/2005 | Sato et al. |
| 2005/0091511 A1 | 4/2005 | Nave et al. |
| 2005/0097348 A1 | 5/2005 | Jakubowski et al. |
| 2005/0222958 A1 | 10/2005 | Hasegawa et al. |
| 2006/0026690 A1 | 2/2006 | Yu |
| 2006/0069926 A1 | 3/2006 | Ginter et al. |
| 2006/0123412 A1 | 6/2006 | Hunt et al. |
| 2007/0100701 A1 * | 5/2007 | Boccon-Gibod ....... G06F 21/10 705/21 |
| 2007/0157310 A1 | 7/2007 | Kondo et al. |
| 2007/0174424 A1 | 7/2007 | Chen et al. |
| 2007/0186112 A1 | 8/2007 | Perlin et al. |
| 2007/0287471 A1 | 12/2007 | Wood |
| 2008/0072297 A1 | 3/2008 | Lu et al. |
| 2008/0082446 A1 * | 4/2008 | Hicks ................. G21F 21/10 705/51 |
| 2008/0134347 A1 | 6/2008 | Goyal et al. |
| 2008/0148363 A1 | 6/2008 | Gilder et al. |
| 2008/0267406 A1 | 10/2008 | Asokan et al. |
| 2009/0055749 A1 | 2/2009 | Chatterjee et al. |
| 2009/0063867 A1 * | 3/2009 | Granados ............ G06F 21/125 713/187 |
| 2009/0077637 A1 | 3/2009 | Santos et al. |
| 2009/0119218 A1 | 5/2009 | Ooki |
| 2009/0217367 A1 | 8/2009 | Norman et al. |
| 2009/0327091 A1 | 12/2009 | Hartin et al. |
| 2010/0050251 A1 | 2/2010 | Speyer et al. |
| 2010/0192234 A1 | 7/2010 | Sugimoto et al. |
| 2010/0228870 A1 | 9/2010 | Terry |
| 2010/0281537 A1 | 11/2010 | Wang et al. |
| 2010/0293103 A1 | 11/2010 | Nikitin et al. |
| 2010/0299376 A1 | 11/2010 | Batchu et al. |
| 2010/0306668 A1 | 12/2010 | Williams, III et al. |
| 2011/0138174 A1 | 6/2011 | Aciicmez et al. |
| 2012/0137281 A1 | 5/2012 | Kleiner et al. |

OTHER PUBLICATIONS

Pfeiffer et al., Accessibility for the HTML5 <video> element, 2009, ACM.

Bartoletti et al., Jalapa: Securing Java with Local Policies, 2009.

* cited by examiner

* optional

SYSTEM FOR THE DISTRIBUTION AND DEPLOYMENT OF APPLICATIONS, WITH PROVISIONS FOR SECURITY AND POLICY CONFORMANCE

CROSS-REFERENCE TO RELATED APPLICATIONS

This application is a continuation of U.S. patent application Ser. No. 13/226,351, filed Sep. 6, 2011 and titled "SYSTEM FOR THE DISTRIBUTION AND DEPLOYMENT OF APPLICATIONS WITH PROVISIONS FOR SECURITY AND POLICY CONFORMANCE", which claims priority to U.S. Provisional Application No. 61/402,934, filed on Sep. 7, 2010 and titled "A SYSTEM FOR THE DISTRIBUTION AND DEPLOYMENT OF APPLICATIONS, WITH PROVISIONS FOR SECURITY AND POLICY CONFORMANCE", which application in its entirety is incorporated by reference into the present application.

FIELD OF THE INVENTION

The present invention relates to the distribution of software applications and, in particular, the secure and vetted distribution of said applications along with provisions to protect data used by said applications.

DESCRIPTION OF THE RELATED ART

The deployment of personal electronic devices has reached an all time high. These devices include smart telephones, with large memories, contacts data, and web access, as well as tablet computers. With the growing capabilities of such devices, there is no doubt that personal productivity rises. However, the proliferation of these devices creates several management problems in the work environment. These problems are the security of company data that a device could collect, the transfer of that data to a company computer, the use of applications that are trustworthy, and the availability of applications as new ones become available.

Security of Data Collected by a Device

If an employee of a company uses a personal electronic device to capture data, contacts, pictures, or video, the information must be kept secure. This means that there must be some level of password control or encryption to prevent unwanted access to the information, while at the same time allowing the user to access his or her personal information.

Transfer of Data from the Device to a Company Computer

Information that is captured by the device needs to be transferable to a company computer and removed from the device. Therefore, the device must be able to link of with a company computer, perhaps remotely, and transfer its data to that computer in a secure transmission.

Use of Trustworthy Applications

Not every application that operates on a personal electronic device is trustworthy. Some applications access the Web and other resources to accomplish their functions, possibly exposing sensitive data outside of a secure domain in which the application might be operating. Therefore, there needs to be a way to vet applications to assure that minimum standards are met.

Availability of New Applications

Many new applications for personal electronic devices are being developed. It is desirable to vet these new applications and make them available to users of personal electronic devices.

BRIEF SUMMARY OF THE INVENTION

One embodiment of the present invention is a method for deploying applications to endpoint devices, where the method includes: obtaining an application for an endpoint device, where the endpoint device has a particular user and the application includes application logic; launching the application; during the launching of the application, connecting the application to a gateway, determining whether the application is bound to the endpoint device, and halting the launch of the application if the application is not bound to the endpoint device; determining the authenticity of the user; determining whether the application is bound to the user; and invoking the application logic on the endpoint device if the application is bound to the user and to the device and the user is authenticated.

Another embodiment of the present invention is a method of distributing applications where the method includes: receiving an instance of an application into an application distribution system, where the application includes application logic, the application distribution system includes one or more marketplaces with at least one marketplace receiving the instance of the application, and the marketplaces have at least one policy that can be enforced when the application is executed on an endpoint device; and performing an analysis of the application logic according to the at least one policy to ensure that said logic complies with said one or more policies.

Yet another embodiment of the present invention is a method for deploying applications to endpoint devices, where the method includes: obtaining an application for an endpoint device, where the endpoint device has a particular user and the application includes application logic; launching the application; determining the authenticity of the user; determining whether the application is bound to the user; and invoking the application logic on the endpoint device if the application is bound to the user and the user is authenticated.

Yet another embodiment of the present invention is a method for deploying applications to endpoint devices, where the method includes: obtaining an application for an endpoint device, where the endpoint device has a particular user and said application includes application logic; launching the application; during the launching of the application, connecting the application to a gateway, determining whether the application is bound to the endpoint device, and halting the launch of the application if the application is not bound to the endpoint device; determining the authenticity of the user; and invoking the application logic on the endpoint device if the application is bound to the endpoint device and the user is authenticated.

Yet another embodiment of the present invention is a method for deploying applications to endpoint devices, where the method includes: obtaining an application for an endpoint device, where the endpoint device has a particular user and said application includes application logic; launching the application; during the launching of the application, connecting the application to a gateway, determining whether the application is bound to the endpoint device, and halting the launch of the application if the application is not bound to the endpoint device; determining whether the application is bound to the user; and invoking the application logic on the endpoint device if the applications is bound to the user and to the endpoint device.

BRIEF DESCRIPTION OF THE DRAWINGS

These and other features, aspects and advantages of the present invention will become better understood with regard to the following description, appended claims, and accompanying drawings where:

REFERENCE NUMERALS

Figure 1:
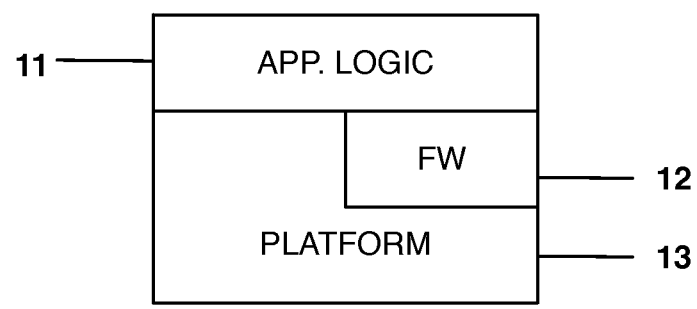
FIG. 1 is a diagram of a mobile application.
Figure 2:
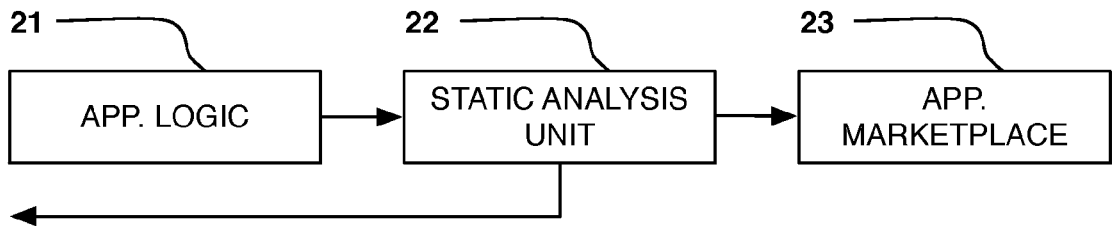
FIG. 2 is a diagram of an instance of application logic being submitted to an application marketplace.
Figure 3:
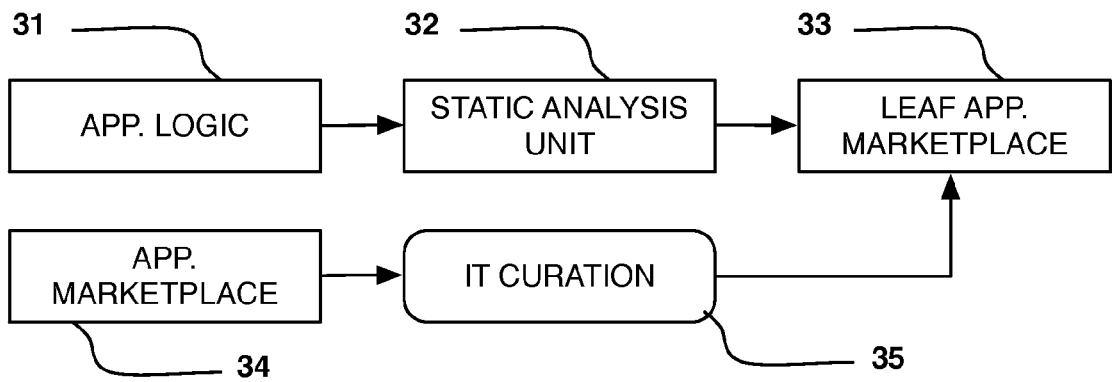
FIG. 3 is a diagram of an instance of application logic being submitted to a leaf application marketplace, as well as an instance of application logic moving from an application marketplace to a leaf application marketplace.

11—Application logic
12—Framework
13—Platform APIs
21—Instance of application logic
22—Static analysis unit
23—Application marketplace
31—Instance of application logic
32—Static analysis unit
33—Leaf application marketplace
41—Instance of application logic
42—Binding unit
43—Executable application
44—Computation endpoint
51—Gateway
52—Application running on a computation endpoint
53—Data servers and services
54—Framework
55—Authentication unit
56—Authentication and authorization servers or services
57—Authorization unit/PEP (Policy Enforcement Point)
58—Data interface unit
59—Policy Decision Point (PDP)
510—Policy Administration Point (PAP)
511—Policy database
512—Key material database
513—Application logic
514—Bus
515—Back-end protocol implementations
516—Service unit
517—Metrics unit
518—Troubleshooting interfaces
519—Analytics, reporting and data export interfaces

DETAILED DESCRIPTION OF THE INVENTION

The invention consists of three major components:

(1) An application framework, consisting of executable code and data, which is bundled with an instance of application logic, also consisting of executable code and data, in order to form an application.

(2) An application distribution system, composed of a network of application marketplaces or "app stores". The purpose of a marketplace is to validate and accept or reject submitted instances of application logic, and to distribute instances of application logic to other marketplaces, and possibly to distribute applications to computation endpoints.

(3) A gateway, which constrains application access to data, such that authentication and authorization policies are enforced. The gateway also supports data collection for analysis and report generation, as well as live troubleshooting of deployed applications.

The Framework

The application framework 12 is combined with an instance of application logic 11 to form an application that can be executed on computation endpoint. Based on policy, the framework ensures that all local data is encrypted, and that all network traffic is encrypted. The framework, based on policy, manages encryption keys. The framework also enforces user authentication policy for the application. By handling all of these security and policy enforcement aspects, the application logic is not required to consider them.

Referring to FIGS. 6A, 6B, 7, 8A, 8B, 9A, 9B, when an application is launched as in steps 204,274,304 it checks to see whether it is bound to a specific device as in steps 220, 306, 286. If it is bound to a device, according to steps 222, 288, 318, and the bound device identity does not match the device identity of the executing computation endpoint, then the application halts, as in steps 224, 290, 320. In some embodiments, depending on policy, an application is allowed to store data on the device. In other embodiments, also dependent on policy, an application allows a user to launch the application even when the application does not have access to a gateway, as in FIG. 7. In yet other embodiments, further dependent on policy, an application also allows a user to launch the application and access data stored on the device. If in the last two cases, if policy is set to require user identity as well, as in steps 206, 276, 256, 306, as a secret or other authorization factor, and if the application is bound to a specific user as in steps 208, 258, 306, and if the user identity entered does not match the bound user identity, then the application halts, as in steps 214, 263, 281, 311.

Figure 4:
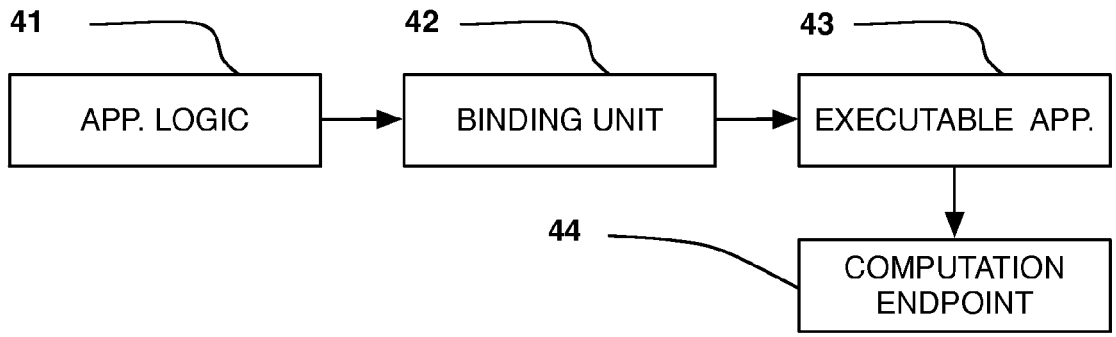
FIG. 4 is a diagram of an instance of application logic in a leaf app marketplace going through the binding unit and being converted to a complete application, then being installed on a mobile device.
Figure 5:
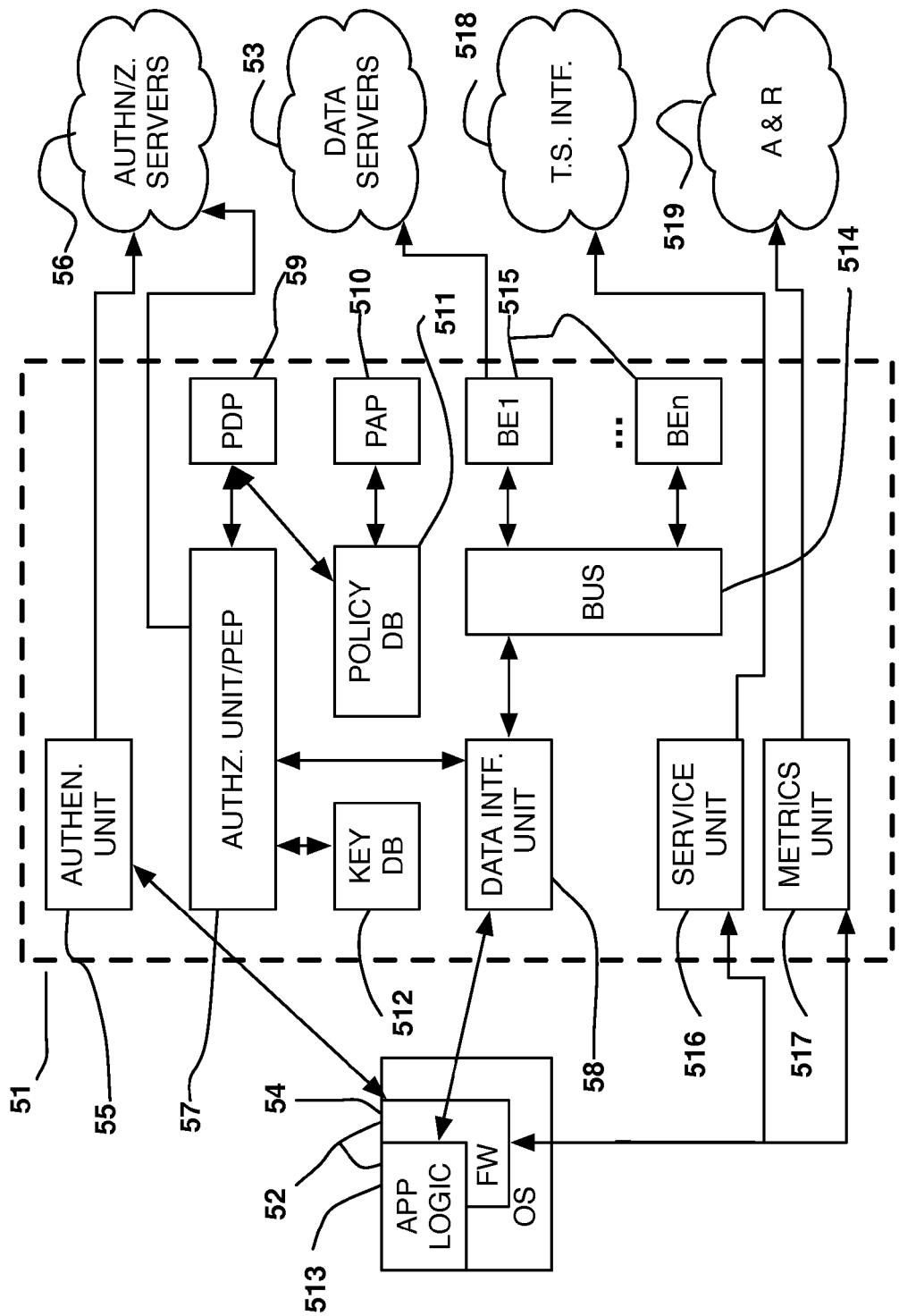
FIG. 5 is a diagram of the application gateway, including major internal and external connections.
Figure 6A:
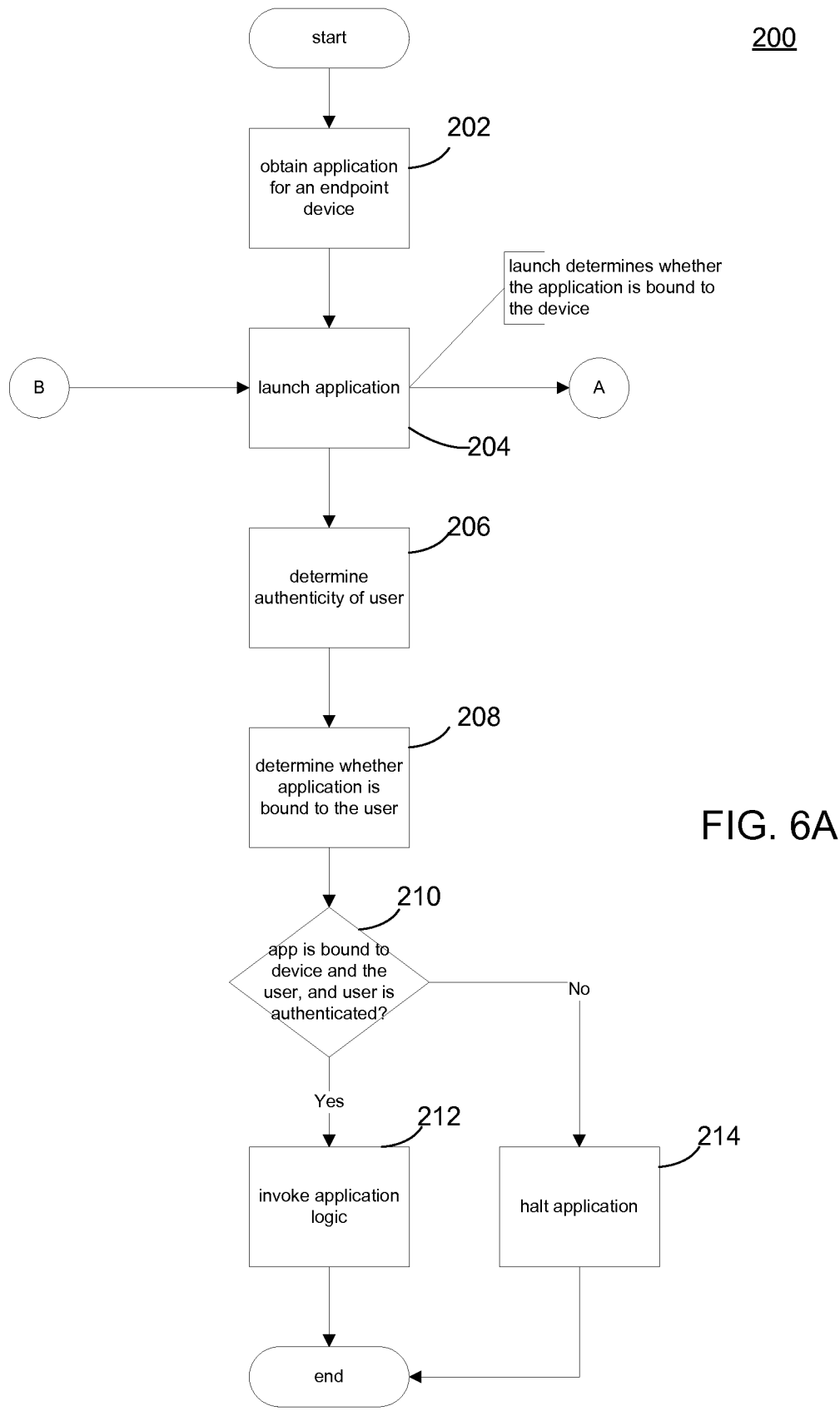
FIG. 6A is a flow chart showing one embodiment of the present invention.
Figure 6B:
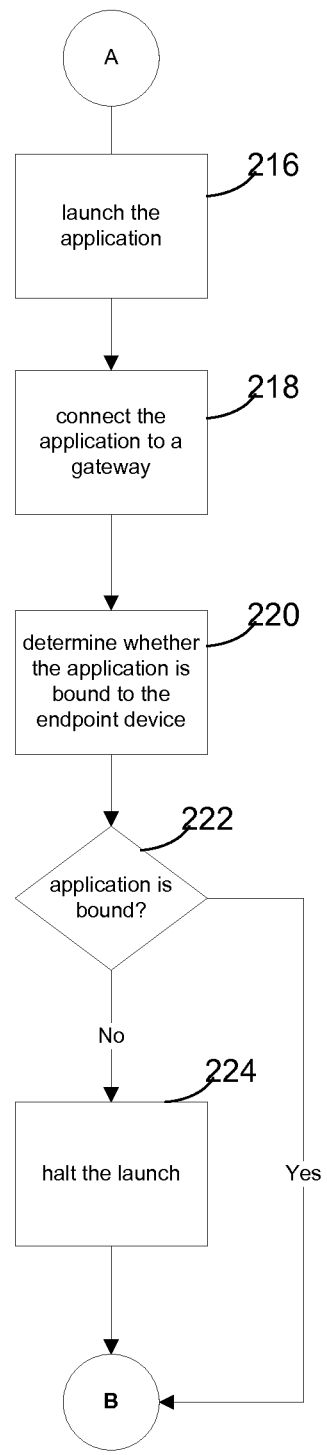
FIG. 6B is a flow chart showing a launching of the application in the embodiment of FIG. 6A.
Figure 7:
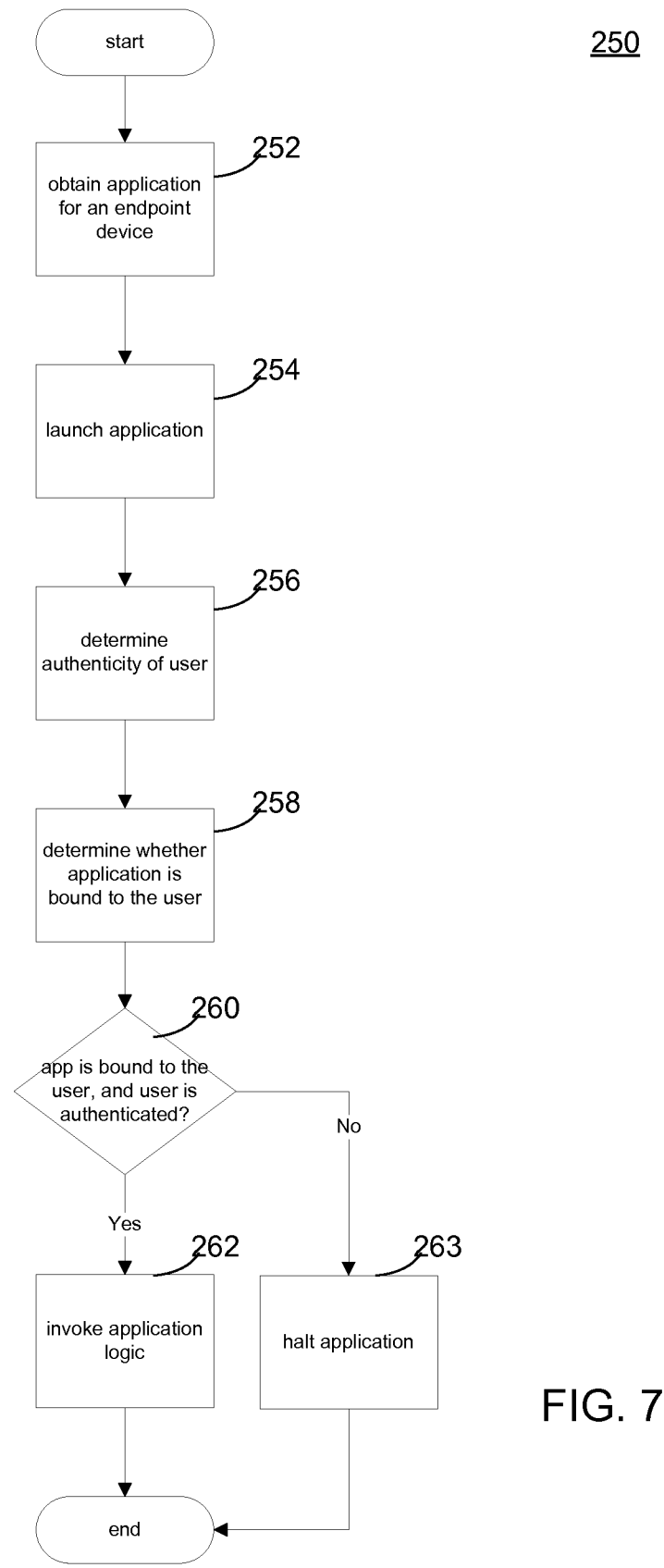
FIG. 7 is a flow chart showing another embodiment of the present invention.
Figure 8A:
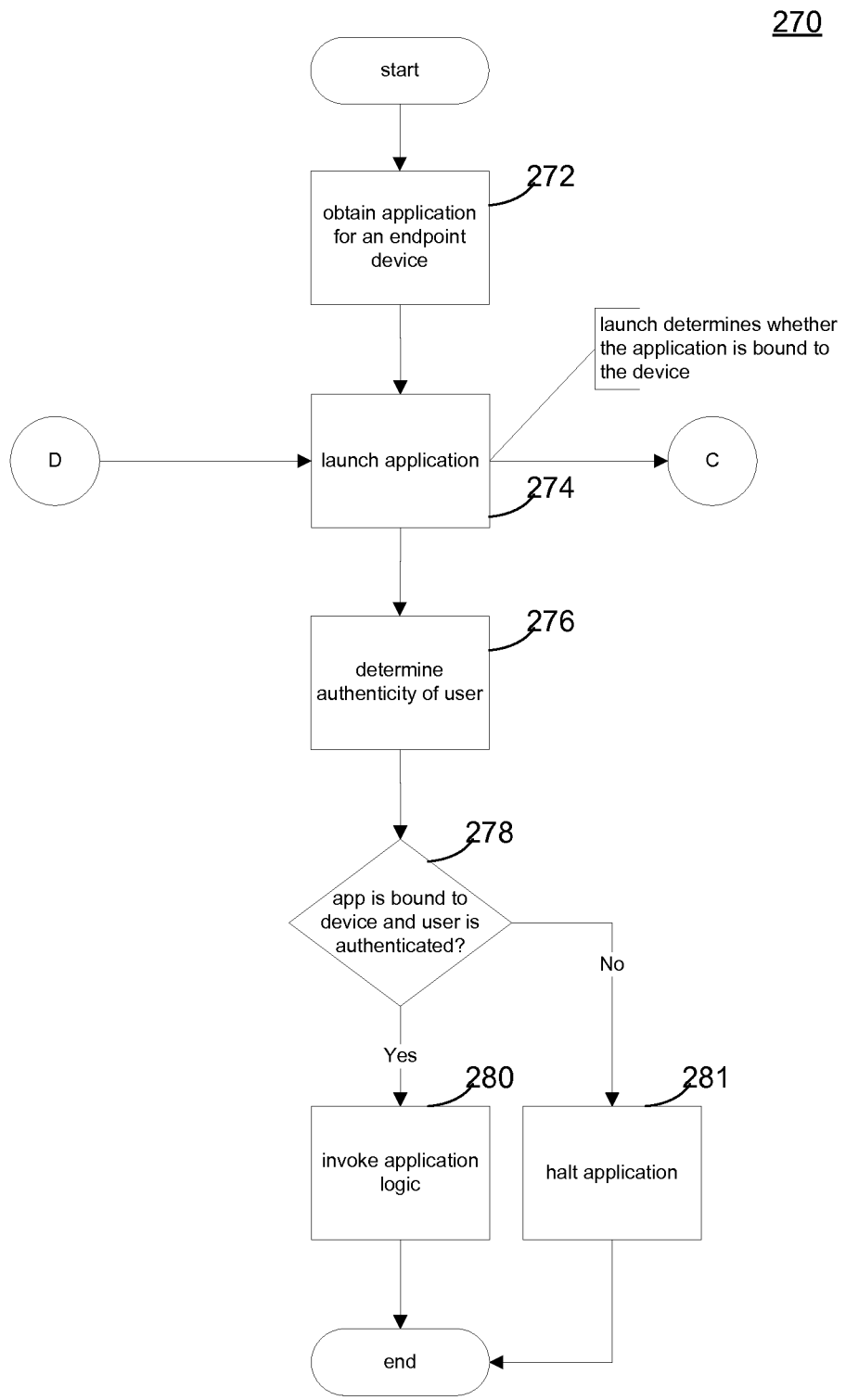
FIG. 8A is a flow chart showing yet another embodiment of the present invention.
Figure 8B:
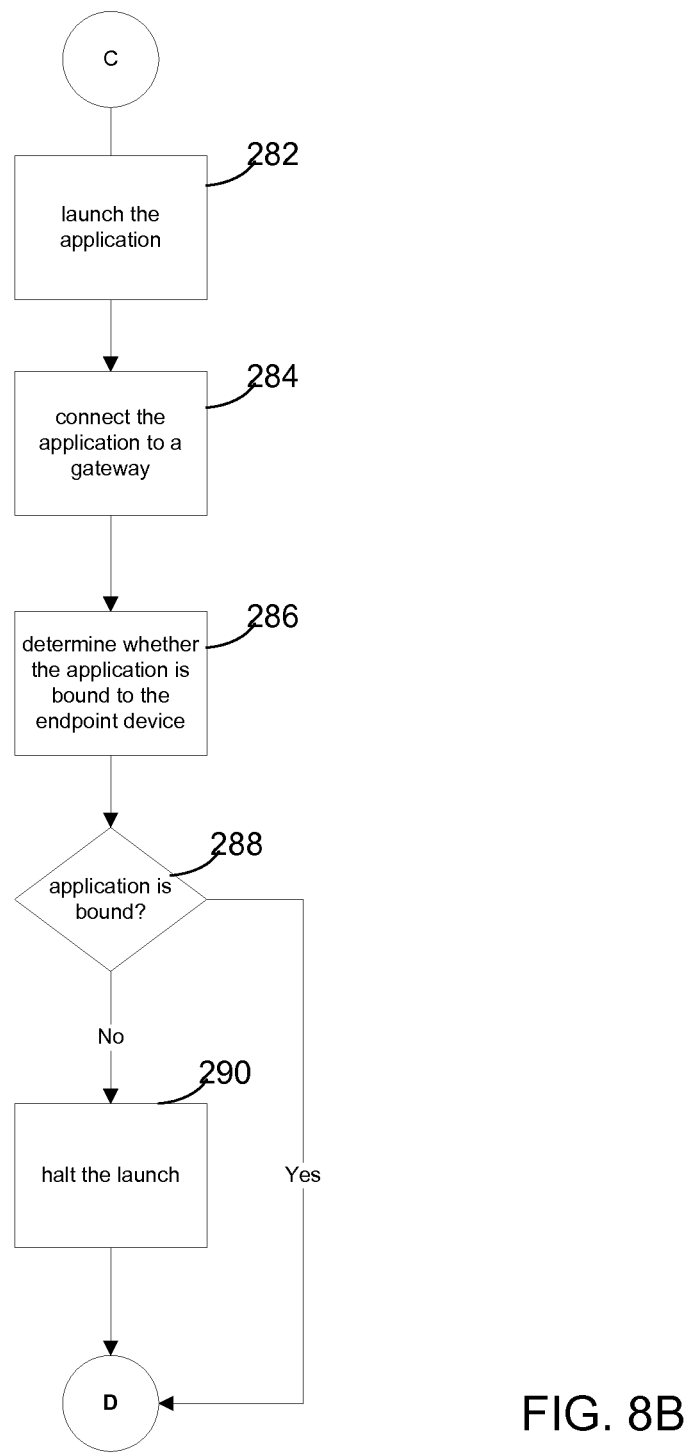
FIG. 8B is a flow chart showing a launching of the application in the embodiment of FIG. 8A.
Figure 9A:
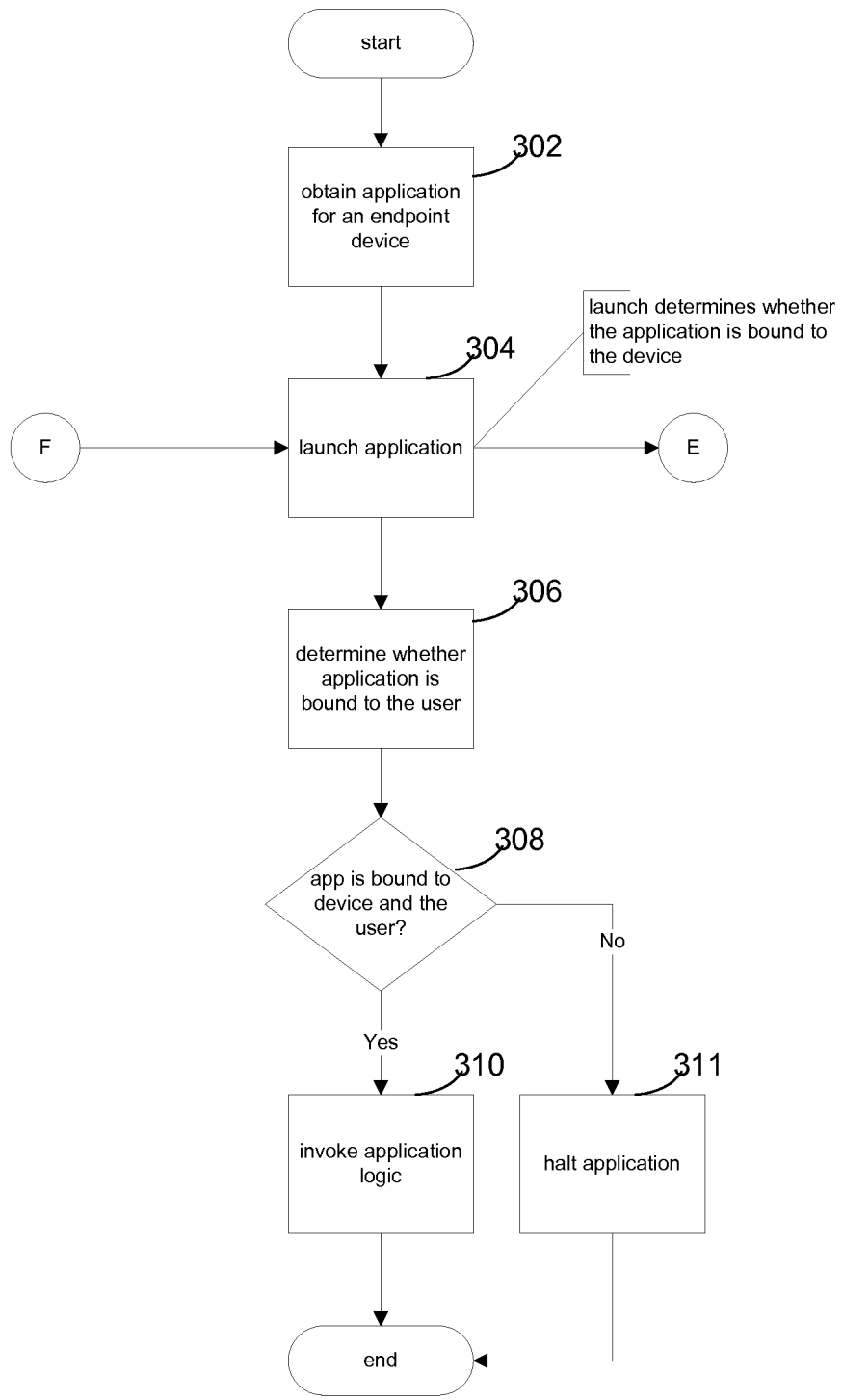
FIG. 9A is a flow chart showing yet another embodiment of the present invention.
Figure 9B:
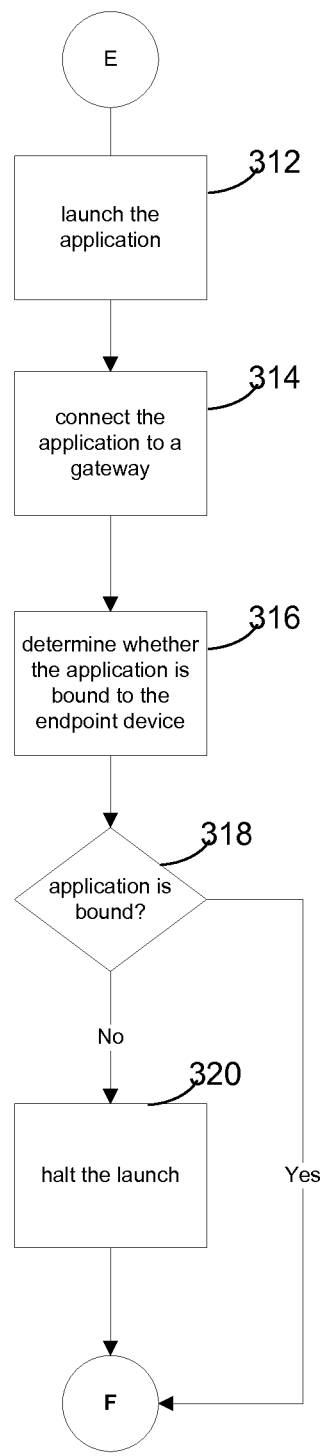
FIG. 9B is a flow chart showing a lunching of the application in the embodiment of FIG. 9A.
Figure 10:
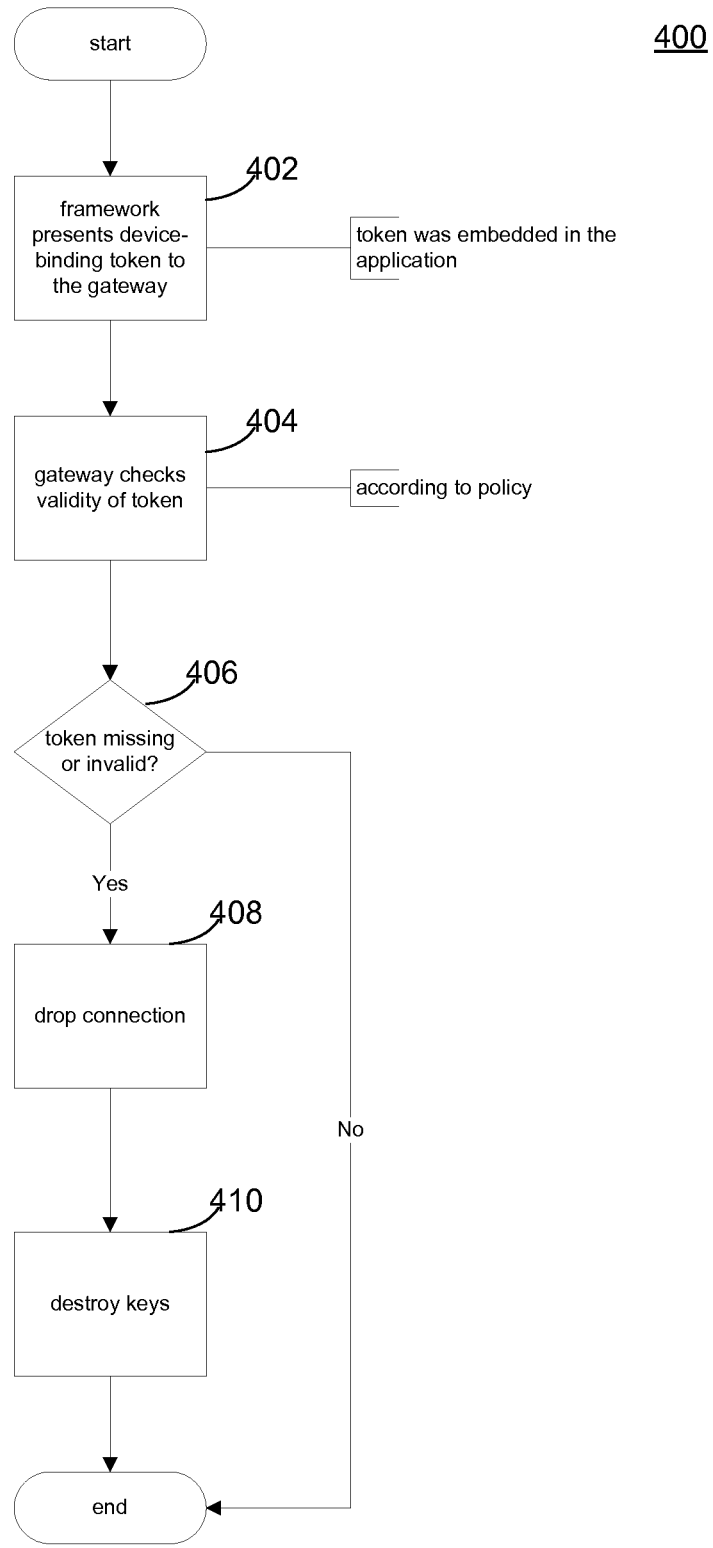
FIG. 10 is a flow chart showing yet another embodiment of the present invention.

In some embodiments, when an application is launched, it attempts to connect to a gateway, depending on policy, as in steps 218, 284, 314. If the application is bound to a specific device as in steps 220, 286, 316, the framework presents a device-binding token to the gateway, as in step 402 of FIG. 10, which was embedded in the application when the application was distributed to the computation endpoint (FIG. 4). If the policy at the gateway is to enforce device binding for this application, then the gateway requires the token and checks its validity, as in step 404 of FIG. 10. A missing or invalid token, as in step 406, causes the gateway to drop the connection with the application, as in step 408. If dictated by policy, the gateway sends a DESTROY-KEYS command, as in step 410, to the application prior to dropping the connection. The framework within the application then recognizes the DESTROY-KEYS command and erases all cryptographic keys held by the application. This renders any encrypted data on the device as unreadable.

Figure 11:
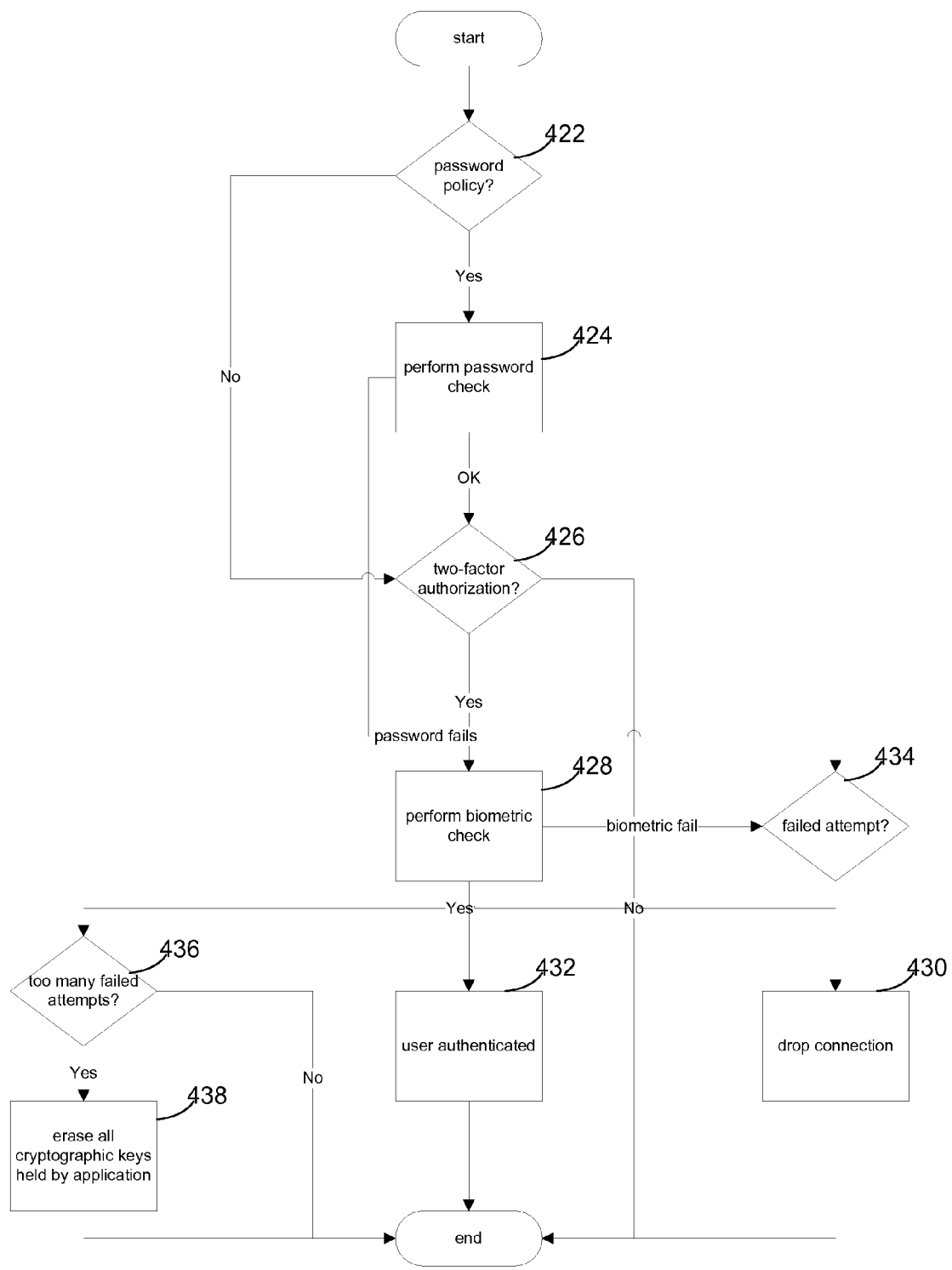
FIG. 11 is a flow chart showing a method of authentication in accordance with an embodiment of the present invention.

After application launch, and after the verification of the device-binding token, if required by policy, user authentication is performed, as in steps 206, 256, 276. The protocol for authentication is determined by policy. For example, in one version, one application is required to perform only password-based authentication as in step 422 of FIG. 11, while another application is required to employ biometric or two-factor authentication, as in steps 426, 428 of FIG. 11. In any case, the framework implements the user interface aspects of authentication, as well as the authentication protocols. Any available user-authentication protocol can be supported. The application logic is not required to be concerned with user authentication. Failure of user authentication, as in step 434, causes the gateway to drop the connection with the application, as in step 430 of FIG. 11. User authentication failure causes the gateway to not invoke the application logic. In some embodiments, depending on configured policy, a number of failed authentication attempts, as in step 436, causes the framework to synthesize the DESTROY-KEYS command and erase all cryptographic keys held by the application, as in step 438.

Figure 12:
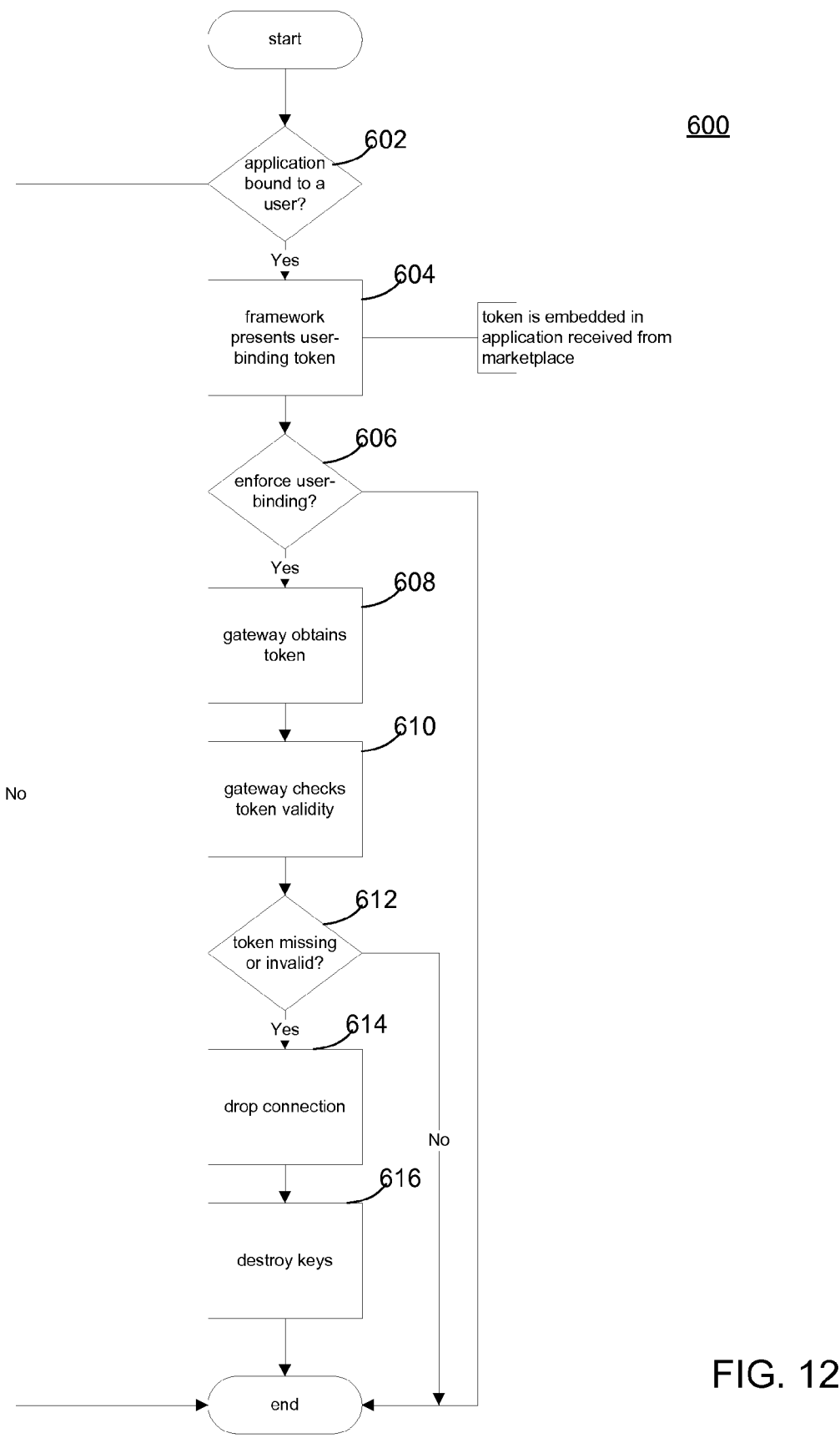
FIG. 12 is a flow chart showing a method of determining whether an application is bound to a user in accordance with an embodiment of the present invention.
Figure 13:
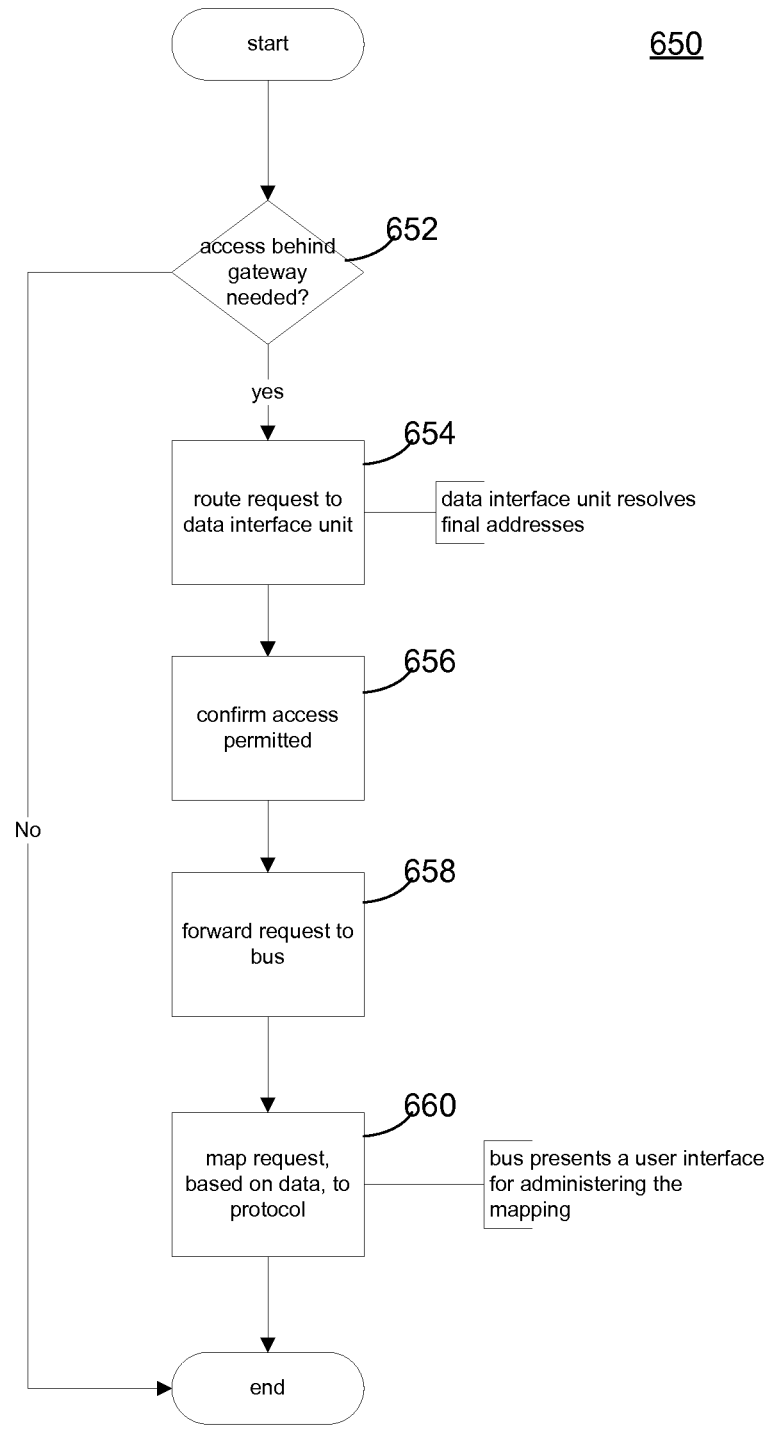
FIG. 13 is a flow chart showing a method of obtaining access behind a gateway in accordance with an embodiment of the present invention.

After a successful authentication, if the application is bound to a specific user, as in step 602 of FIG. 12, the framework presents a user-binding token as in step 604, which was embedded in the application when the application was distributed to the computation endpoint (FIG. 4). If the policy at the gateway is to enforce user binding for this application, as in step 606, then the gateway requires the token and checks its validity, as in steps 608, 610. A missing or invalid token causes the gateway to drop the connection, as in step 614, with the application. Depending on policy, the same DESTROY-KEYS sequence is executed, as in step 616.

After success in any user authentication or device/user-binding checks, the application logic is invoked, as in steps 212, 262, 280, 310. Any access to local data storage by the application logic is via framework data APIs. These APIs ensure that all local data storage is encrypted according to policy. Any access to data across a network by the application logic is via framework network APIs. These APIs ensure, with the cooperation of the gateway, that all data access across the network is authorized by policy and secured/encrypted according to policy.

In some embodiments, the capabilities of the computation endpoint require that access to certain aspects of the computation endpoint be routed via framework APIs (e.g., access to a BlueTooth or data card interface). In other embodiments, the capabilities of the operating system on the computation endpoint require that access to any inter-application communication facilities be routed through framework APIs. In general, where the leakage of data is possible, or where the injection of data is possible, the framework APIs must be used so that the framework can enforce policies around data security.

The framework also includes utility APIs to enable diagnosis and remote troubleshooting.

These APIs include logging, event, counter and gauge facilities, as well as instrumented state machine mechanisms. When application logic is implemented in a way that uses these APIs, much of the execution history and application state is exposed to the framework. The framework is in turn able to make this information available for remote troubleshooting as well as data collection.

The Application Distribution System

Figure 14A:
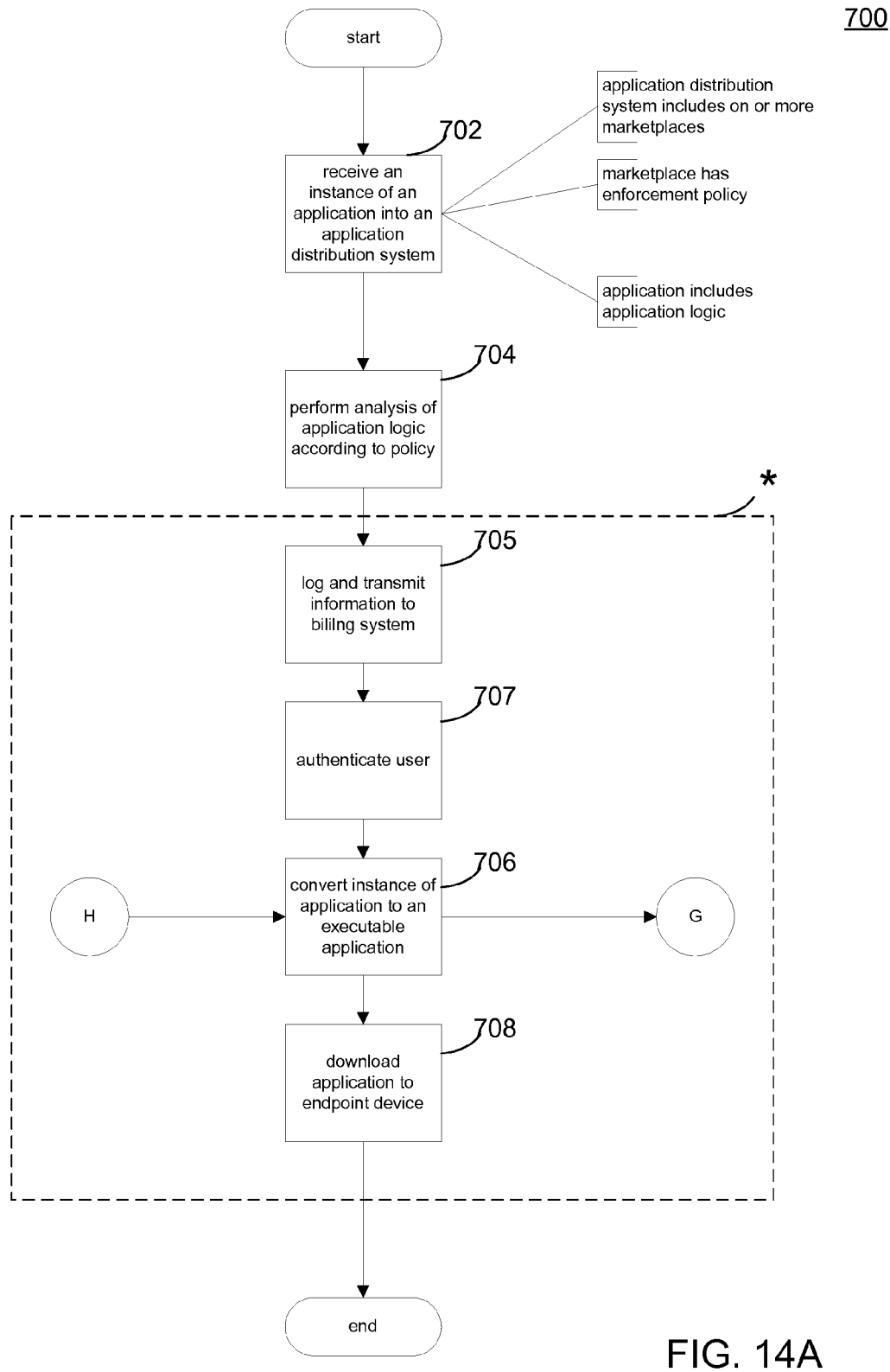
FIG. 14A is a flow chart showing yet another embodiment of the present invention.
Figure 14B:
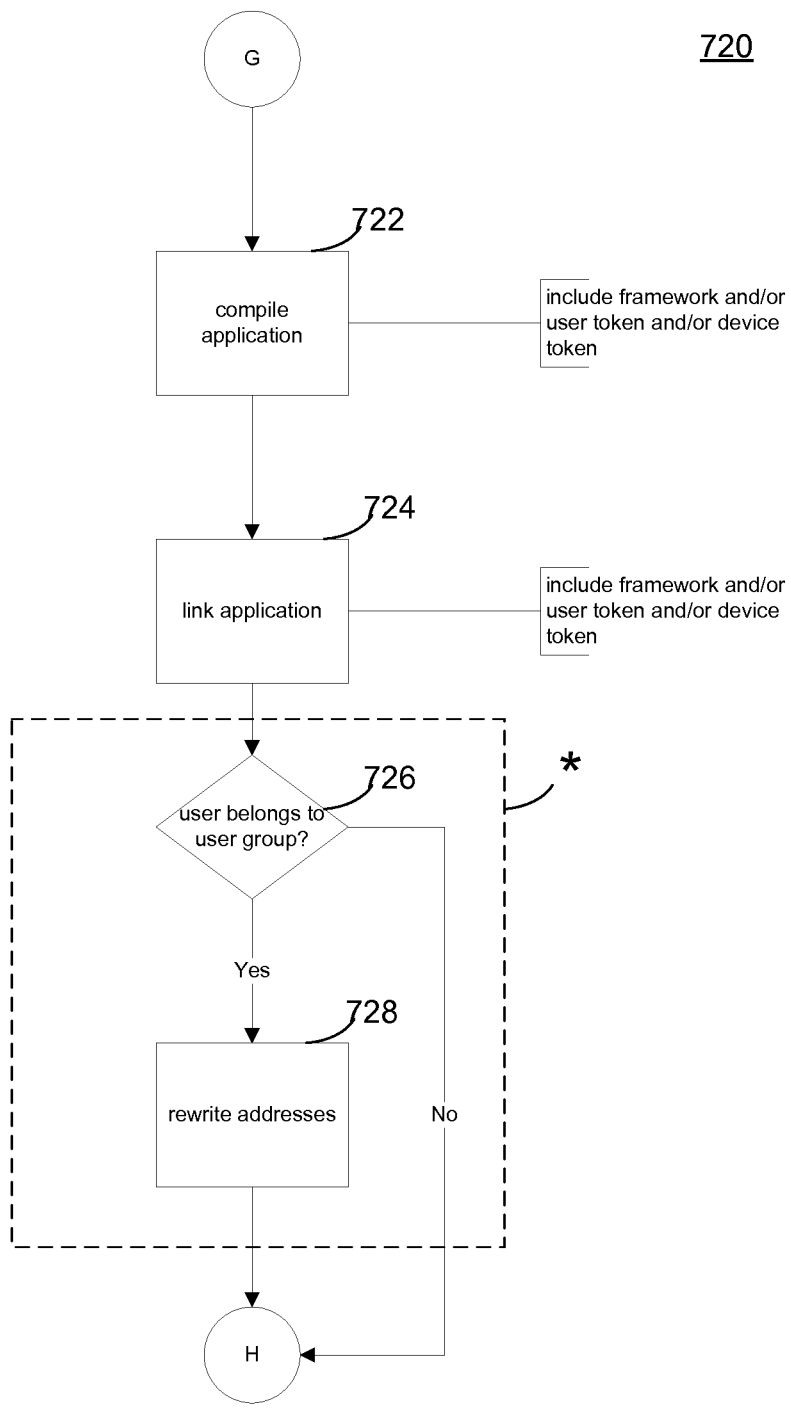
FIG. 14B is a flow chart showing a method converting an instance of an application to an executable application in accordance with an embodiment of the present invention.

The application distribution system accepts instances of application logic 21 31, validates 32 42 them and distributes them in a network of marketplaces. A marketplace 23 33 that distributes executable applications to computation endpoints is a leaf marketplace 33. Whenever an instance of application logic is introduced into the application distribution system, it is submitted to a marketplace, as in step 702 of FIG. 14A. A marketplace performs static analysis 3242 of the application logic, as in step 704, to ensure that the application complies with policy when executed on a computation endpoint. The state (e.g. source code vs. object code vs. byte code or other) of the application logic submitted to the marketplace depends on the target OS of the computation endpoint. The reason for the variance is that the marketplace's static analysis function must be able determine with certainty that API usage policies are being followed. For example, the marketplace must be able to ensure that an OS API granting access to local storage is not referenced by the application logic.

In some embodiments, in cases of ambiguity, the marketplace static analysis unit rejects the submitted application logic. In some embodiments, a marketplace accepts instances of application logic from other marketplaces as well as from developers. In this case, IT personnel perform a curation function 35, as in step 704 of FIG. 14A, deciding which instances of application logic to import. A marketplace need not perform static analysis on application logic received from another marketplace. In other embodiments, the application distribution system is configured to use cryptographic security techniques, such as but not limited to public key cryptography, to ensure that instances of application logic have been properly analyzed, as in step 704 of FIG. 14A and that the other marketplace is authorized to participate in the exchange of instances of application logic.

In some embodiments, a marketplace is required to log and transmit information related to the transfer of instances of application logic to a billing system, as in stop 705. In embodiments with a leaf marketplace, the leaf marketplace is also required to log information related to the downloading of applications to computation endpoints. In some versions of the invention, such information is also transferred to a billing system.

A marketplace has a user interface where users can browse available applications and request application downloads. In some embodiments, a marketplace is required to authenticate users, as in step 707, before users are allowed access to the marketplace, or at the point of application download, or neither, or both. In some embodiments, a policy determines which apps a given user sees as available. Embodiments of the user interface include a web-interface, a mobile application, or other computer-human interface.

When an app is to be made available for download, the marketplace's binding unit 42 converts the instance of application logic into an executable application 43, as in step 706. The binding unit completes any necessary compilation, assembly, configuration, linking or other operation required to transform the instance of application logic into an executable application, as in steps 722, 724. In some embodiments, depending on policy and the target OS of the computation endpoint, the framework is combined, as in steps 722, 724 with the instance of application logic by the binder, or possibly at an earlier stage in the path from development of the instance of application logic to the final binding of the application for download. If dictated by policy, the binding unit generates the device-binding token, the user-binding token or both. Any required binding tokens are built into the application, as in steps 722, 724 prior to download.

In some embodiments, depending on policy, the application logic, and the deployment scenario, data access addresses is rewritten by the binding unit, as in steps 726, 728. For example, policy can dictate that an application communicate with one set of servers when launched by employees working in the finance department, and an entirely different set of servers when launched by other employees. In such cases, the binding unit fixes the data access addresses differently depending on the employee's group designation. The example given is for illustrative purposes; the data binding capability of the binding unit is total—any address in the data access namespace can be rewritten.

The Gateway

The gateway 51 is coupled between an application running on a computation endpoint 52 and data servers or data services 53 accessible by the application. The gateway ensures that the running of the application and the accesses by applications to data conforms to policy conformant, as in steps 404 of FIG. 10 and 610 of FIG. 12. The gateway also supports live troubleshooting of applications on the compute endpoint, as well as the collection of data for reporting or analysis. In one embodiment a gateway is a single entity; in other embodiments, a gateway comprises multiple physical entities.

As described, the framework 54 communicates with the authentication unit 55 in the gateway 51. The authentication unit 55 implements the required authentication protocols, interworking between the framework 54 embedded in the application and configured authentication servers and services 56.

The authorization unit/PEP (Policy Enforcement Point) 57 receives requests from the authentication unit 55 to ensure that a user/computation endpoint is entitled to run any given application. The authorization unit/PEP 57 also receives requests from the data interface unit 58 to ensure that data accesses performed on behalf of an application are permitted by policy. In some embodiments, the authorization unit/PEP 57 makes a request to external authorization servers or services 56, including PDPs (Policy Decision Points). In other embodiments, the gateway has an on-board PDP 59, and also exports an interface for the authoring and maintenance of policy/PAP (Policy Administration Point) 510. In such a case, the on-board PAP maintains a policy database 511, which is referenced by the on-board PDP 59.

Figure 15:
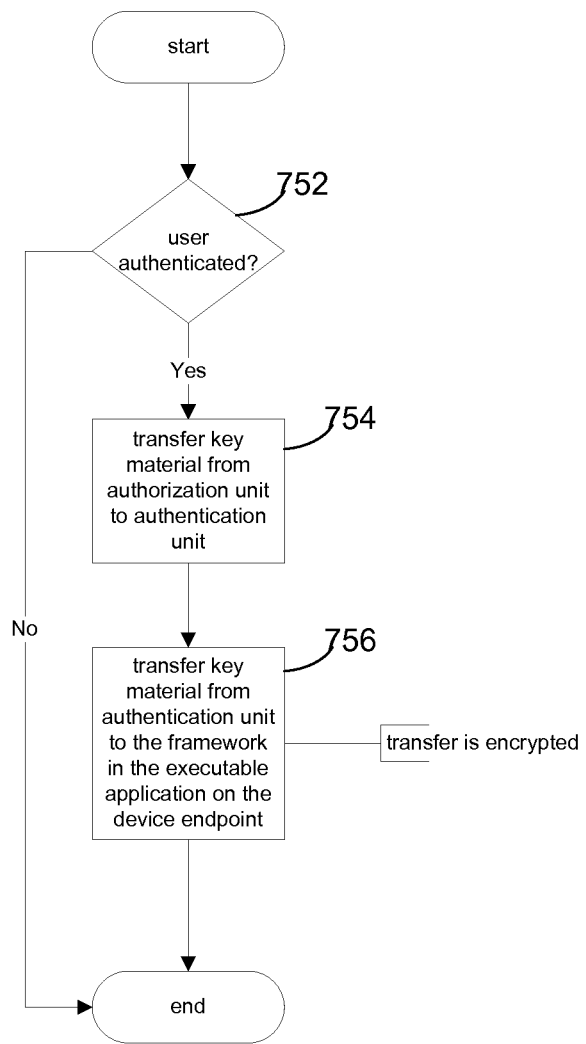
FIG. 15 is a flow chart showing a method of transferring key material to an endpoint device in accordance with the present invention.

The authorization unit 57 also has access to per-application instance key material 512. Upon satisfying all authentication requirements, as in step 752 of FIG. 15, appropriate key material is passed from the authorization unit 57 to the authentication unit 55, as in step 754, and down to the framework code, in step 756, residing in the executing application 54 on the computation endpoint. This key material enables the application to access stored data on the computation endpoint via the framework APIs. It bears repeating that all communication between the application and the gateway is encrypted, as noted in step 756. Also, in some embodiments, the authorization unit employs caches of policy evaluation results.

When attempting to access data behind the gateway, as in step 652, the application logic 513 calls the framework APIs 54, which in turn attempt the access via the gateway 51. Such accesses are routed to the data interface unit 58, as in step 654. In some embodiments, if any additional translation of data access addresses is required, the data interface unit resolves final addresses prior to checking policy. After the data interface unit 58 has confirmed via the authorization unit 57 that access is permitted by policy, as in step 656, the request is forwarded to the bus 514, as in step 658.

In some embodiments, the bus 514 handles pendant and non-pendant access requests. For non-pendant requests, the gateway 51 retains sufficient state to appropriately handle the response.

The bus 514 maps the request, based on the address of the data, as in step 660, to the appropriate back-end protocol implementation 515. The bus 514 maintains a mapping function, and presents a user interface for administration of the underlying mapping data. In some embodiments, the underlying mapping data is administered programmatically by an external entity.

Back-end protocol implementations 515 accept requests from the bus 514 and proxy requests into the protocol supported by the specific back-end. In this way, the gateway is extensible to additional data access protocols by adding additional backend protocol implementation modules 515.

The service unit 516 provides a user interface and a programmatic interface 518 for the troubleshooting of remote applications. The troubleshooter, after being authenticated, can access the state of a currently running application. The degree of access to application state depends of the degree to which the application logic made use of the framework utility APIs.

The metrics unit 517 captures execution data from the gateway, and also execution data from applications serviced by the gateway. The metrics unit presents a user interface and a programmatic interface where policy as to which data is to be kept is maintained 519. The metrics unit can be embodied such that this policy is stored internally or outside the gateway. The metrics unit can be configured to store data inside the gateway, or to push data to external storage for off-board analysis 519. The metrics unit offers a user interface and a programmatic interface for generating and downloading reports 519.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for deploying applications to endpoint devices, the method comprising:
   launching an application on an endpoint device, wherein a user-binding token and a device-binding token are embedded in the application, and wherein the endpoint device includes a device ID and a user ID of a user of the device;
   determining whether the application is bound to the endpoint device by comparing the device-binding token to the device ID, and terminating the application if the device-binding token does not match the device ID;
   determining whether the application is bound to the user by comparing the user-binding token to the user ID to determine if the user-binding token matches the user ID, and terminating the application if the user-binding token does not match the user ID;
   wherein the application holds cryptographic keys for enabling a decryption of encrypted data on the endpoint device; and
   erasing any cryptographic keys held by the application when the device-binding token does not match the device ID or the user-binding token does not match the user ID.

2. The method of claim 1, comprising:
   connecting the application to a gateway, wherein the gateway connects to an authorization server; and
   disconnecting the application from the gateway if the user-binding token does not match the user ID.

3. The method of claim 2, comprising:
   determining an authenticity of the user, wherein determining the authenticity of the user includes:
      sending a request from the endpoint device to an authorization unit in the authorization server via the gateway; and
      receiving a positive or negative response from the authorization unit in the authorization server via the gateway.

4. The method of claim 3, wherein the gateway includes the authorization unit; and
   wherein the step of determining the authenticity of the user includes:
      relaying a request from the endpoint device to the authorization unit of the gateway; and
      receiving a positive or negative response from the authorization unit of the gateway.

5. The method of claim 4,
   wherein the step of receiving the positive or negative response from the authorization unit of the gateway includes receiving a plurality of negative responses; and
   comprising erasing the cryptographic keys held by the application when the authorization unit receives the plurality of negative responses.

6. The method of claim 2, comprising:
   receiving cryptographic key material from the gateway after authenticating the user, the key material enabling the application to access any stored data on the endpoint device.

7. The method of claim 2, comprising:
   erasing all cryptographic keys held by the application prior to disconnecting the application from the gateway to cause any encrypted data on the endpoint device to be unreadable.

8. The method of claim 1,
   wherein the endpoint device contains local data storage for holding data relating to operation of the application; and
   comprising encrypting data held in the local data storage.

9. The method of claim 2, comprising transferring data to or from the endpoint device and the gateway,
   wherein the step of transferring data occurs via one or more application interfaces (APIs) in the endpoint device; and
   wherein at least one API ensures that any data transferred is securely transferred.

10. The method of claim 9, wherein the step of transferring data includes encrypting the data transferred to or from the endpoint device, and wherein the step of encrypting the data transferred to or from the endpoint device includes preventing leakage of data from or the injection of data into the transferred data.

11. The method of claim 9,
    wherein the gateway includes a bus unit and a data interface unit that determines whether a data access is permitted; and
    wherein the step of transferring data includes routing a data transfer request to the data interface unit to determine that the data access is permitted and if so, forwarding the request to the bus unit.

12. The method of claim 11,
    wherein the gateway includes the bus unit that handles data access requests; and
    wherein the step of transferring data includes requesting the bus unit to transfer the data, the bus unit mapping the request, based on an address of the data, to a protocol implementation.

13. The method of claim 12, wherein the protocol implementation transferring the data to or from a data server in accordance with the protocol implementation to which the request is mapped.

14. The method of claim 1, comprising:
    authenticating a troubleshooting routine; and
    troubleshooting the application via the authenticated troubleshooting routine.

15. A computing device configured for deploying applications to endpoint devices, comprising:
    a processor;
    memory in electronic communication with the processor, wherein the memory stores computer executable instructions that when executed by the processor cause the processor to perform the steps of:
       launching an application on an endpoint device, wherein a user-binding token and a device-binding token are embedded in the application, and wherein the endpoint device includes a device ID and a user ID of a user of the device;
       determining whether the application is bound to the endpoint device by comparing the device-binding token to the device ID, and terminating the application if the device-binding token does not match the device ID;
       determining whether the application is bound to the user by comparing the user-binding token to the user ID to determine if the user-binding token matches the user ID, and terminating the application if the user-binding token does not match the user ID;
       wherein the application holds cryptographic keys for enabling a decryption of encrypted data on the endpoint device; and erasing any cryptographic keys held by the application when the device-binding token does not match the device ID or the user-binding token does not match the user ID.

16. The computing device of claim 15, wherein the instructions executed by the processor cause the processor to perform the steps of:
connecting the application to a gateway, wherein the gateway connects to an authorization server; and
disconnecting the application from the gateway if the user-binding token does not match the user ID.

17. The computing device of claim 16, wherein the instructions executed by the processor cause the processor to perform the steps of:
determining an authenticity of the user, wherein determining the authenticity of the user includes:
sending a request from the endpoint device to an authorization unit in the authorization server via the gateway; and
receiving a positive or negative response from the authorization unit in the authorization server via the gateway.

18. The computing device of claim 17,
wherein the gateway includes the authorization unit; and
wherein the step of determining the authenticity of the user includes:
relaying a request from the endpoint device to the authorization unit of the gateway; and
receiving the positive or negative response from the authorization unit of the gateway.

19. The computing device of claim 18,
wherein the step of receiving the positive or negative response from the authorization unit of the gateway includes receiving a plurality of negative responses; and
comprising erasing the any cryptographic keys held by the application when the authorization unit receives the plurality of negative responses.

20. A non-transitory computer-readable storage medium storing computer executable instructions that when executed by a processor cause the processor to perform the steps of:
launching an application on an endpoint device, wherein a user-binding token and a device-binding token are embedded in the application, and wherein the endpoint device includes a device ID and a user ID of a user of the device;
determining whether the application is bound to the endpoint device by comparing the device-binding token to the device ID, and terminating the application if the device-binding token does not match the device ID;
determining whether the application is bound to the user by comparing the user-binding token to the user ID to determine if the user-binding token matches the user ID, and terminating the application if the user-binding token does not match the user ID;
wherein the application holds cryptographic keys for enabling a decryption of encrypted data on the endpoint device; and
erasing any cryptographic keys held by the application when the device-binding token does not match the device ID or the user-binding token does not match the user ID.

* * * * *